Oct. 9, 1934.     J. SENFT     1,976,527
TIRE CHAIN
Filed Jan. 4, 1932     2 Sheets-Sheet 2
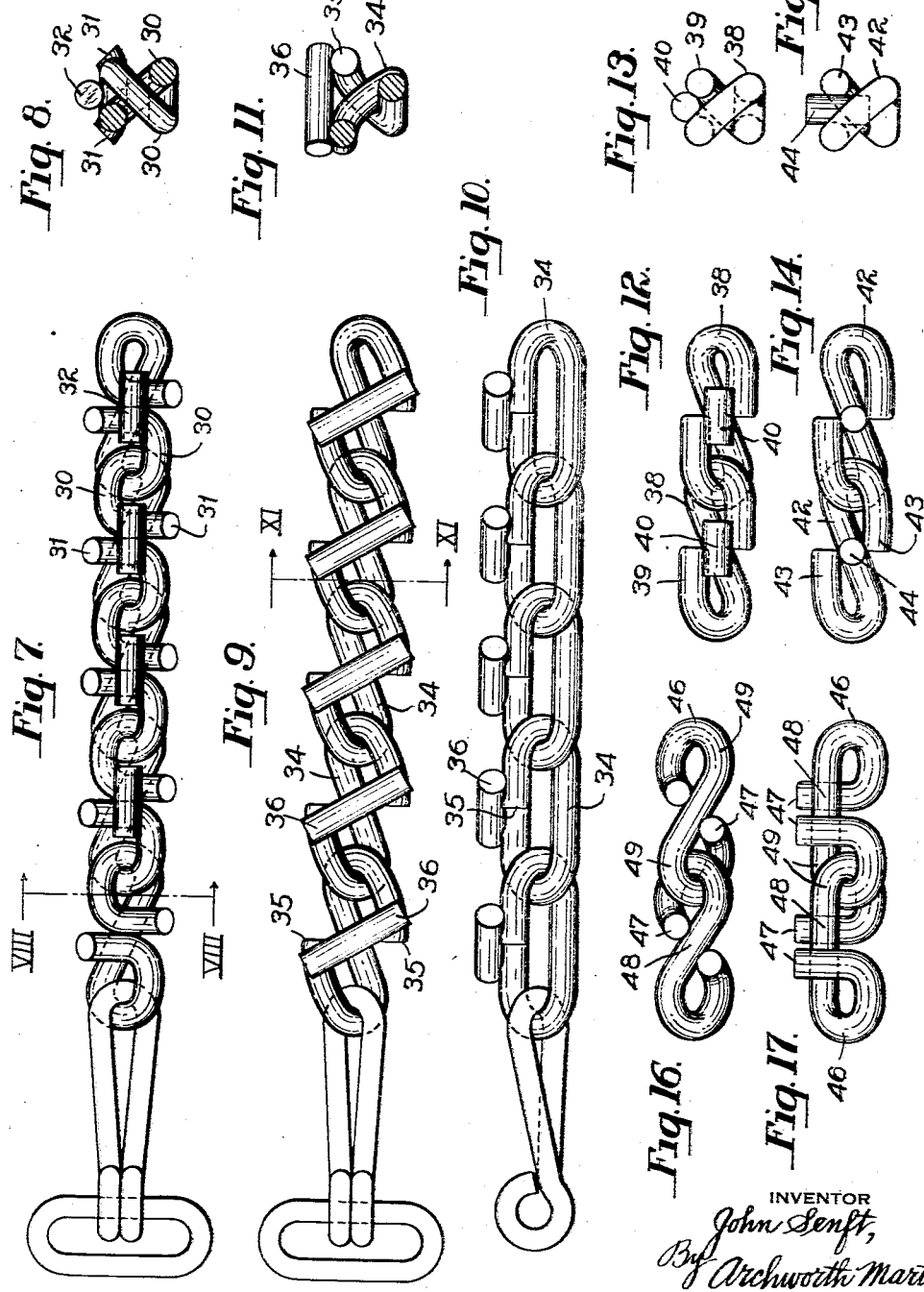
INVENTOR
John Senft,
By Archworth Martin,
Attorney.

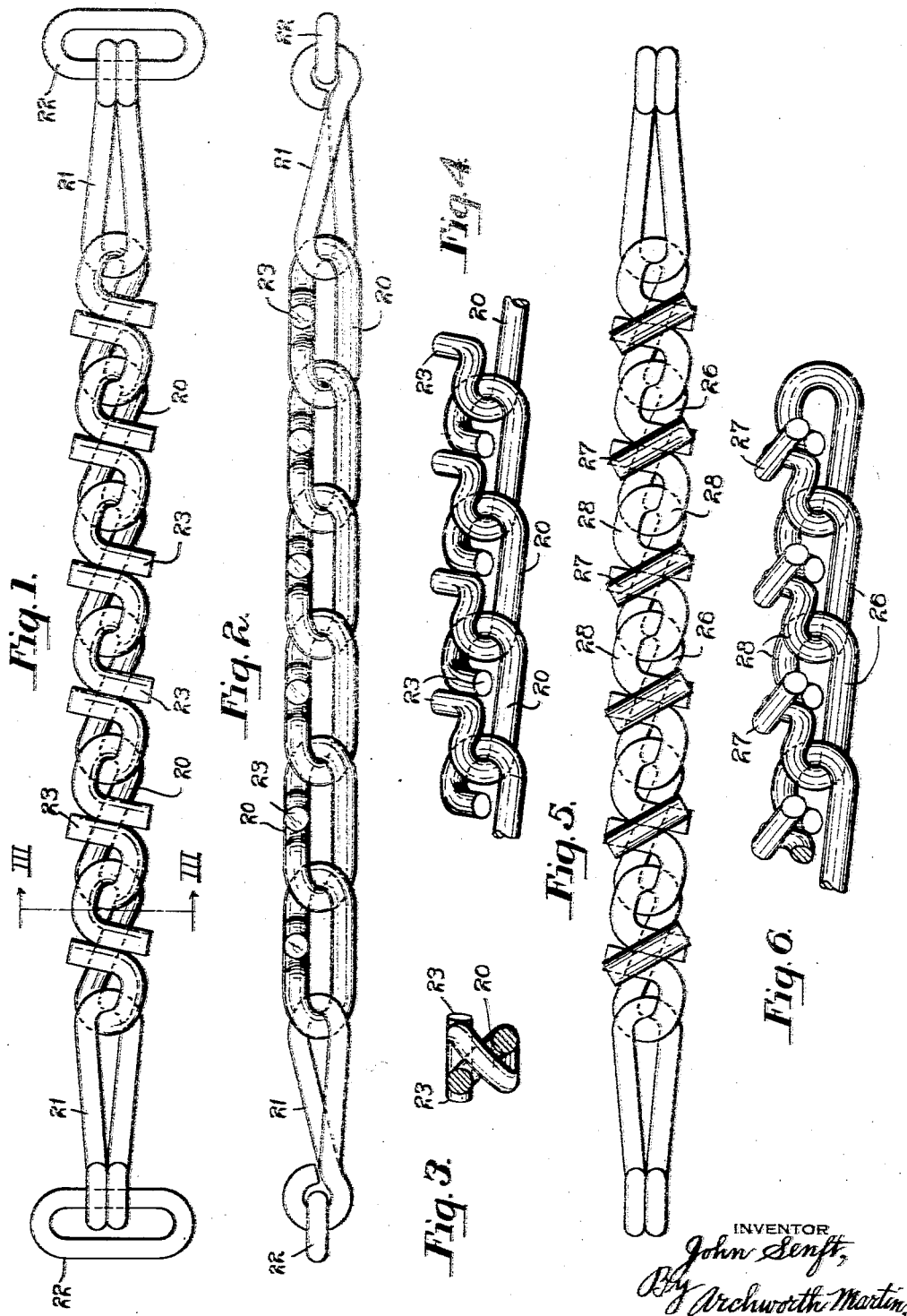

Patented Oct. 9, 1934

1,976,527

UNITED STATES PATENT OFFICE 1,976,527

TIRE CHAIN

John Senft, York, Pa., assignor to The McKay Company, Pittsburgh, Pa., a corporation of Pennsylvania Application January 4, 1932, Serial No. 584,711

9 Claims. (Cl. 152—14)

My invention relates to tire chains, and more particularly to those designed for use on wheels of motor vehicles and the like, but I contemplate that the invention in various of its forms may be put to various other uses.

My invention has for one of its objects the manufacture of a chain in an economical manner and with welding operations largely, if not entirely, eliminated.

Another object of my invention is to provide an anti-skid chain of simple form and which will have longer life and better non-skid properties than various types of chains heretofore employed.

Some of the forms which my invention may take are shown in the accompanying drawings wherein Figure 1 is a plan view of one form of chain; Fig. 2 is a side elevational view thereof; Fig. 3 is a view taken on the line III—III of Fig. 1; Fig. 4 is a perspective view thereof; Fig. 5 is a view similar to Fig. 1, but showing the calks applied to the chain links; Fig. 6 is a perspective view of the structure of Fig. 5; Fig. 7 is a plan view showing a modification of the structure of Fig. 5; Fig. 8 is a view taken on the line VIII—VIII of Fig. 7; Fig. 9 is a plan view of still another form of chain; Fig. 10 is a side elevational view thereof; Fig. 11 is a view taken on the line XI—XI of Fig. 9; Fig. 12 is a plan view showing another modification of the structure of Fig. 5; Fig. 13 is an end view thereof; Fig. 14 shows still another modification of the structure of Fig. 5; Fig. 15 is an end view thereof; Fig. 16 shows a further modification of the structure of Fig. 1, and Fig. 17 is a side elevational view thereof.

Referring first to Figs. 1 to 4, I show a cross chain composed of links 20, the drawings showing the face or road-engaging surfaces of the links. The links are shown as connected by hooks 21 to the usual side chains or tension members 22 that are annularly arranged at each side of the tire when the cross chains are in place. It will be understood that means other than the side chains 22 may be employed for holding the cross chains in place upon the wheel.

The links 20 are shown as twisted somewhat after the manner of ordinary tire chain links, so that they will tend to lie in a common plane, instead of alternate links lying in planes at right angles to one another as in the case of untwisted links.

The links 20 distinguish from the ordinary twisted link in that the extremities of the wire or rod from which each link is formed are not brought into end to end relation and welded. The ends of the links are extended as indicated at 23, in opposite directions, but in parallelism with one another. It is not necessary that these ends be welded together, but they may be welded, if desired.

The extremities 23 of each link extend laterally beyond the plane of the link and give an extended and increased wearing surface for engagement with the roadway, the rear or inner sides of the links lying against the tire and having sufficient rolling action thereon to permit the straight extended portions 23 of the links to lie flat on the road. The extensions 23 not only make for stability of the cross chain when they engage the roadway, but they add increased wearing service to the chain, and hence increase the life thereof, besides rendering the chain more resistant to skidding and slipping than in the case of the ordinary twisted link chain.

Referring now to Figs. 5 and 6, I show a chain composed of links 26 which are formed substantially in the same manner as the links 20 but to which are added calks 27. The calks are welded diagonally across the extended parallel ends of the links 26. These calks are superposed upon the outer sides of the link ends and project outwardly a considerable distance beyond the protruding bends 28 of the links 26, thus protecting these protruding portions from the wear that is commonly imposed on the correspondingly protruding bends of ordinary twisted chain links. Calks 27 will be almost completely worn through before the bends 28 of the links are subjected to appreciable wear. Furthermore, they have a more effective biting action on the roadway, or on ice, than do the curved bends of the ordinary twisted chain link.

In Figs. 7 and 8, I show cross chain links 30 which are somewhat similar to the links 20, but whose ends 31 may extend somewhat angularly with respect to the perpendicular plane of the links, as viewed in Fig. 7. Calks 32 are welded to the ends 31 of the links and serve not only as tie members for such ends as in Fig. 5, but also increase the life of the links, because they extend outwardly from the body portions of the links and are worn to a considerable extent before the bodies of the links begin to wear. The extremities 31, particularly when they extend angularly outward, also serve to increase the life of the chain and cooperate with the calks 32 to resist skidding.

In Figs. 9, 10 and 11, I show a chain having links of still another form. These links 34 have their extremities 35 spaced apart, and extending generally parallel to one another, but in opposite directions. The links 34 are twisted somewhat after the manner of ordinary twisted links, but their ends 35 are not brought together and welded as in the usual practice. The ends 35 are bridged by calks 36 which are welded thereto and which have the major portion of wear until they are worn through. As shown more clearly in Figs. 10 and 11, the calks 36 are located outwardly beyond the bends at the ends of the links. After the calks 36 have worn through, the links will have further life substantially equal to the life of the ordinary twisted link chain which is not provided with calks.

In Figs. 12 and 13, the links 38 are formed similarly to the links 34, but their ends 39 are preferably brought somewhat closer together, so that the longitudinal sides of the calks 40 may be welded thereto. The calks 40 function, as do the calks 32, to assist in relieving the bodies of the links from wear, and to increase the anti-skid properties of the links. The distance which the calks 40 protrude from the link will depend upon the relative positions of the link ends 39. Obviously, if these link ends are brought closer together than is shown in Fig. 12, the calks 40 will be supported at a greater distance from the body of the link, while if the ends 39 are spread farther apart, the calks 40 can be placed in the same plane as the ends 39. In the latter instance, the link will have greater road-engaging area, but the body of the link will be more quickly subjected to tractive wear.

Referring to Figs. 14 and 15, I show links 42 that are of substantially the form of the links 38, but whose ends 43 are so positioned as to receive calks 44 between them, the vertical sides of the calks being welded either to the contacting surfaces of the ends 43 or, at their lower ends, to the bodies of the links, or both. This form of link, as in the case of the other calk links, increases the life of the links, and improves the anti-skid qualities thereof.

In Figs. 16 and 17, I show links 46 whose ends 47 are brought into approximate parallelism with one another and extend outwardly from the plane of the links, at opposite sides of the body portions 48 of the links. These ends 47 extend outwardly beyond the protruding ends or bends 49 of the links, and serve to relieve such bends of wear, and to bite into the roadway, to thus resist skidding.

I claim as my invention:

1. A tire chain composed of links formed of bar stock whose ends are disposed in side-by-side relation at the road engaging side of the chain, and a calk secured to said ends.

2. A chain link formed of bar stock whose extremities are in non-abutting relation, and a calk welded to the end portions of the bar stock, at points adjacent to said extremities.

3. A chain link formed of bar stock whose extremities are in non-abutting relation, and a calk welded to the end portions of the bar stock, at points adjacent to said extremities, and extending outwardly from the plane of said end portions.

4. A chain link formed of bar stock whose ends are disposed in side-by-side relation, and a calk secured to said ends in diagonally overlying relation thereto.

5. A chain link formed of bar stock whose ends are disposed in side-by-side relation, and a calk secured to said ends in non-parallelism thereto.

6. A tire chain containing inter-connected links twisted to lie in approximately parallel planes, and each composed of bar stock whose ends are disposed in side-by-side relation and terminate at opposite sides of the longitudinal center line of the link, and calks welded to and bridging said ends at the outer sides of the links.

7. A tire chain composed of inter-connected links twisted to cause them to lie in approximately parallel planes which are perpendicular to a wheel tread against which they are held, each link being composed of bar stock whose ends terminate at the road-engaging side of the link, and a calk welded to said ends.

8. A tire chain comprising a group of inter-connected, looped links which are twisted to lie in approximately parallel planes, and means for supporting the links with their loops in planes approximately perpendicular to the tire surface to which they are applied, each link being composed of bar stock whose end portions are at the outer side of the link and constitute a part of the road-engaging edge thereof, the said ends extending in opposite directions, transversely of the plane of the link and being spaced from the inner side of the link a distance substantially equal to the thickness of the bar stock.

9. A link of elongated loop form, composed of bar stock whose end portions are at the mid-portion of one side of the link, the said ends extending in opposite directions, transversely of the plane of the link, adjacent to the mid-portion thereof, and being spaced from the opposite side of the link a distance approximately equal to the thickness of the bar stock.

JOHN SENFT.